(12) United States Patent
Broders

(10) Patent No.: US 8,921,741 B2
(45) Date of Patent: Dec. 30, 2014

(54) COOKING TEMPERATURE AND POWER CONTROL

(71) Applicant: Adam Broders, Worcester, MA (US)

(72) Inventor: Adam Broders, Worcester, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 14/052,833

(22) Filed: Oct. 14, 2013

(65) Prior Publication Data

US 2014/0033928 A1 Feb. 6, 2014

Related U.S. Application Data

(63) Continuation of application No. 13/074,400, filed on Mar. 29, 2011.

(51) Int. Cl.
*H05B 1/02* (2006.01)
*G05D 23/19* (2006.01)
*F24C 7/08* (2006.01)
*F24C 3/12* (2006.01)

(52) U.S. Cl.
CPC ............... *F24C 7/087* (2013.01); *F24C 3/126* (2013.01); *G05D 23/1902* (2013.01); *F24C 7/086* (2013.01); *H05B 2213/07* (2013.01); *H04B 6/062* (2013.01)
USPC ........... 219/488; 219/497; 219/492; 219/710; 219/627; 99/339

(58) Field of Classification Search
CPC ........ H05B 6/12; H05B 1/0258; H05B 1/061; F24C 7/087; F24C 7/086
USPC ......... 219/497, 492, 627, 667, 621, 620, 626, 219/294, 710, 715, 483–486, 412–414, 219/507; 99/339
See application file for complete search history.

(56) References Cited

U.S. PATENT DOCUMENTS

| | | | | |
|---|---|---|---|---|
| 4,197,581 A | * | 4/1980 | Watrous et al. | 700/90 |
| 4,580,025 A | * | 4/1986 | Carlson et al. | 219/708 |
| 4,740,664 A | * | 4/1988 | Payne et al. | 219/448.12 |
| 6,169,486 B1 | * | 1/2001 | Berkcan et al. | 340/584 |
| 6,953,919 B2 | * | 10/2005 | Clothier | 219/620 |
| 2006/0049178 A1 | * | 3/2006 | Tominaga et al. | 219/627 |
| 2010/0147832 A1 | * | 6/2010 | Barker et al. | 219/626 |

* cited by examiner

*Primary Examiner* — Mark Paschall
(74) *Attorney, Agent, or Firm* — Brian M. Dingman; Dingman, McInnes & McLane, LLP

(57) ABSTRACT

A system and method for controlling the power delivered to cookware by a power control system that comprises a heating control user interface that is set by the user to a particular heating control user interface set point within an operating range. A controller derives from the heating control user interface set point a desired cookware temperature set point, and, over at least a first portion of the operating range that encompasses the boiling range, also derives from the heating control user interface set point a maximum limit of power that can be delivered to the cookware to maintain the cookware at the desired cookware temperature set point. The maximum power limit varies monotonically over the first portion of the operating range.

19 Claims, 4 Drawing Sheets

COOKING TEMPERATURE AND POWER CONTROL

CROSS-REFERENCE TO RELATED APPLICATIONS

This application is a continuation of application Ser. No. 13/074,400, filed on Mar. 29, 2011. The disclosure of this prior patent application is incorporated herein in its entirety.

FIELD

This disclosure relates to controlling cooking operations.

BACKGROUND

Cooking results can be improved by knowledge of the temperature of the food being cooked, or of the cookware itself. In electrically-operated cooktops, such as induction and resistive cooktops, temperature can be controlled by controlling the power delivered to the electric heating element. In gas cooktops, temperature can be controlled by controlling the flow of gas to the burner. However, since temperature control is not very effective at controlling boiling vigor, temperature-based cooking power control systems are not able to provide the user desired control over boiling vigor.

SUMMARY

In general, one aspect of the disclosure features a system for controlling the power delivered to cookware by a power control system that comprises a heating control user interface that is set by the user to a particular heating control user interface set point within an operating range. The system comprises a controller that derives from the heating control user interface set point a desired cookware temperature set point, and that, over at least a first portion of the operating range that encompasses the boiling range, also derives from the heating control user interface set point a maximum limit of power that can be delivered to the cookware to maintain the cookware at the desired cookware temperature set point, wherein the maximum power limit varies monotonically over the first portion of the operating range.

Various implementations may include one or more of the following features. The first portion of the operating range may be from about 100° C. to about 150° C. The controller, over a second portion of the operating range, may control the power delivered to the cookware to maintain the desired cookware temperature. The second portion of the operating range may comprise temperatures above the first portion of the operating range, and may further comprise temperatures below the first portion of the operating range. The monotonic variation in the maximum power limit may comprise a monotonic increase in the maximum power limit. The first portion of the operating range may be defined by a lowest temperature and a highest temperature, and the maximum power limit over the first portion of the operating range may define a monotonically increasing curve from the lowest to the highest temperature. The curve may define a relatively steep slope proximate both the lowest and highest temperatures, and a less steep slope over the rest of the first portion of the operating range. The maximum power limit at the lowest temperature may be about 0% of the power that can be delivered to the cookware by the power control system, and at the highest temperature may be about 100% of the power that can be delivered to the cookware by the power control system. Under a predetermined condition the controller may cause delivery to the cookware of more power than the maximum power limit. The predetermined condition may comprise reaching and maintaining at least the lowest temperature of the first portion of the operating range.

Various additional implementations may include one or more of the following features. The heating control user interface may comprise a one-dimensional control device, which may be a virtual slider. The controller may define a maximum delivered power control arrangement comprising first and second temperature servo controls and a function that defines a particular maximum delivered power based on the desired temperature set point. The system may further comprise a temperature sensor that determines the cookware temperature, and the controller may select the maximum delivered power as the minimum of first and second control sub-arrangements, wherein the first control sub-arrangement comprises the first temperature servo control inputted with the desired temperature set point and the cookware temperature, and the second control sub-arrangement comprises the maximum of the second temperature servo control inputted with a fixed temperature and the cookware temperature, and the function that defines a particular maximum delivered power based on the desired temperature set point. The function that defines a particular maximum delivered power based on the temperature set point may comprise a lookup table.

In general, in another aspect the disclosure features a system for controlling the power delivered to cookware by a power control system that comprises a heating control user interface that is set by the user to a particular heating control user interface set point within an operating range. The system comprises a controller that derives from the heating control user interface set point a desired cookware temperature set point, and that, over a first portion of the operating range that is from about 100° C. to at least about 120° C., also derives from the heating control user interface set point a maximum limit of the power that can be delivered to the cookware to maintain the cookware at the desired cookware temperature set point, wherein the maximum power limit defines a monotonically increasing curve over the first portion of the operating range, wherein the curve defines a relatively steep slope proximate both the lowest and the highest temperatures of the first portion of the operating range, and a less steep slope over the rest of the first portion of the operating range. The controller, over a second portion of the operating range that comprises all temperatures below the lowest temperature of the first portion of the operating range and all temperatures above the highest temperature of the first portion of the operating range, controls the power delivered to the cookware to maintain the desired cookware temperature.

In general, in another aspect the disclosure features a method of controlling the power delivered to cookware by a power control system that comprises a heating control user interface that is set by the user to a particular heating control user interface set point within an operating range. A desired cookware temperature set point is derived from the heating control user interface set point. Over a first portion of the operating range that encompasses the boiling range, the method further comprises also deriving from the heating control user interface set point a maximum limit of power that can be delivered to the cookware to maintain the cookware at the desired cookware temperature set point, wherein the maximum power limit varies monotonically over the first portion of the operating range.

DETAILED DESCRIPTION

Figure 1:
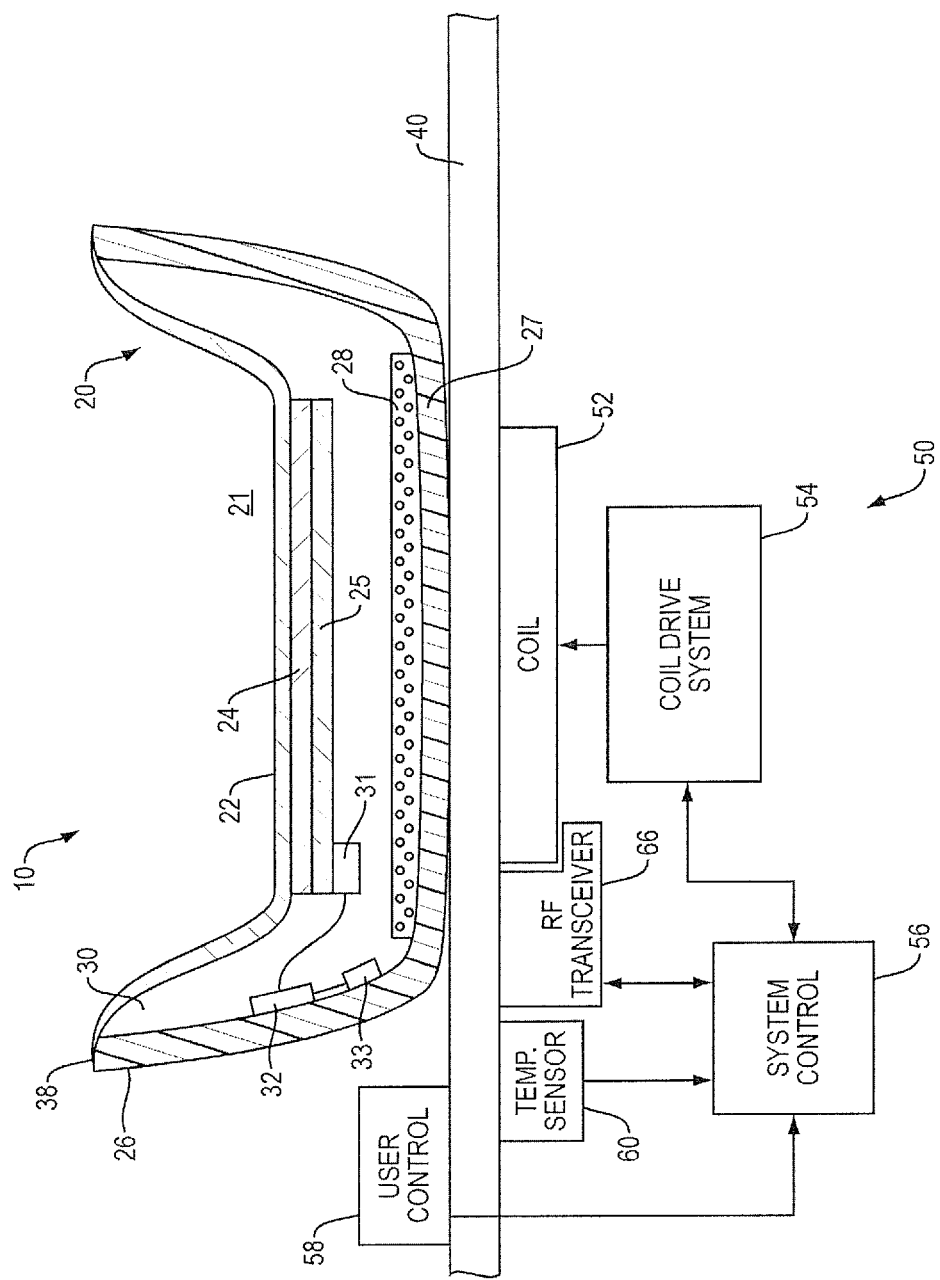
FIG. 1 is a schematic, partially cross-sectional diagram of a cooking temperature and power control system for cookware that is heated by an induction heating system.

Cooking temperature and power control system 10, FIG. 1, uses a single one-dimensional user control to automatically control both the temperature of inductively-heated cookware 20 as well as the power provided to cookware 20; power control allows control of the vigor at which the cookware contents boil. Cookware 20 is located on cooktop 40. Induction cooking system 50 provides controlled amounts of power to cookware 20. Although the embodiment depicted in FIG. 1 uses electrical energy to provide the power that heats the cookware, and operates inductively, neither the source of power nor the manner in which the power is provided to the cookware are limitations of the disclosure. System 10 is able to control the provision of power to cookware regardless of the source of power (whether electrical or gas, for example) or the manner in which the power is provided to the cookware (electrically via induction or resistive heating, or by burning a cooking gas, for example).

Cookware 20 comprises inner wall 22 that heats food, water or other substances located in cookware 20 within cavity 21 formed by wall 22. Cookware 20 further comprises outer wall 26. Preferably outer wall 26 is made fully or partially from a material that is not heated by the time-varying electromagnetic field that emanates from induction coil 52. This aspect allows the energy to be focused on inner wall 22 and also helps to accomplish cookware that remains relatively cool on the outside during use. However, this disclosure is not limited to use with such cool cookware and can be used with more traditional cookware in which the outer wall is hot. Outer wall 26 can be made from a plastic material such as bulk molding compound, melamine or liquid crystal polymer, for example. Inner wall 22 and outer wall 26 are preferably spaced from one another to define space 30 therebetween. Inner wall 22 and outer wall 26 may be sealed to one another along circumferential contact area 38. This accomplishes a sealed inner space or chamber 30 between walls 22 and 26. Chamber 30 can be used to house other aspects of cookware 20 and also can contribute to the desired thermal isolation of outer wall 26 from inner wall 22.

Target 25 is made from an electrically conductive material and preferably a ferromagnetic material such as 400 series stainless steel, iron or the like. Target 25 is the sole or primary material that is inductively heated via induction coil 52. Preferably, heat spreader 24 is directly coupled to both target 25 and inner wall 22. Heat spreader 24 is made of a highly heat conductive substance such as aluminum; the use of a heat spreader accomplishes more even heating of wall 22 than would be the case if target 25 was directly coupled to wall 22, although either arrangement is contemplated in this disclosure.

Thermal insulation 28 of a desired construction and configuration is typically located within chamber 30 and spaced from target 25. Insulation 28 helps to inhibit heat transfer from target 25 to outer wall 26. Insulation 28 may be located only on the bottom portion 27 of outer wall 26 as shown in the drawing or may extend partially or fully up along the inside of the upper portion of wall 26, and may fill some or essentially all of chamber 30. In one non-limiting embodiment, insulation 28 is a layer comprising an aerogel that is bounded on both faces by a reflective film such as a metalized plastic film in which the metal is etched in a manner to inhibit inductive heating of the metallization. This insulation is highly effective at inhibiting heat transfer between target 25 and the portion of outer wall 26 that is covered by insulation 28. Heat transfer can be further inhibited by other constructional aspects such as creating a vacuum within space 30 or filling space 30 with a material that is a poor heat conductor, for example a gas such as argon gas. More generally, cool cookware includes thermal insulation and/or a vacuum between the inner cooking surface and the external cookware wall, to inhibit heat transfer from the cooking surface to the external wall. Aspects of the disclosure relate to any type or design of such cool cookware.

Aspects of cookware 20 are further disclosed in commonly-assigned U.S. patent application Ser. No. 12/205,447, filed on Sep. 5, 2008, the disclosure of which is incorporated herein by reference. However, the disclosure herein is not limited to any particular type of cookware. For example the temperature and power control system can be used with more traditional cookware in which the external wall is directly heated and thus at about the same temperature as the food being cooked.

Induction cooking system 50 comprises induction coil 52 located just underneath or potentially embedded within cooktop 40. Cooktop 40 is preferably made from a ceramic glass material as is well known in the art, but that is not a limitation as because the cookware is cool the cooktop may be made of other materials that are not as heat resistant, including materials that have not traditionally been used for cooktops such as solid surface countertop materials, wood, tile, laminate countertop materials, vinyl, glass other than ceramic glass, plastic, etc. Coil drive system 54 provides power to coil 52 under control of induction cooking system control 56. Control 56 is preferably a microprocessor that executes software that performs mathematical or logical operations. The use of a controller to control operation of a coil drive for an induction coil in an induction cooking system is known in the art. Aspects of system 50 are further disclosed in commonly-assigned U.S. patent application Ser. No. 12/335,787, filed on Dec. 16, 2008, the disclosure of which is incorporated herein by reference.

Cookware temperature sensing is accomplished at one or more locations of the cookware. Temperature sensing can be accomplished with direct contact temperature sensors such as thermocouples or thermistors, for example. Temperature sensing can also be accomplished with non-contact indirect sensors such as optically-based temperature sensors (e.g., infrared sensors). In the non-limiting embodiment depicted in FIG. 1, direct contact temperature sensor 31 is coupled to target 25 either directly, or indirectly via a temperature conductive substance such as heat conductive epoxy. Temperature sensor 31 determines the temperature of target 25 at the location of temperature sensor 31. Alternatively, temperature sensor 31 could be located on the side of inner wall 22 facing chamber 30, or could be located elsewhere in chamber 30 at a location where the temperature sensor was exposed to one or more heated portions of the cookware. A non-contact sensor such as an optical sensor could be located spaced from target 25 and/or inner wall 22, for example in chamber 30 or in or on the inside of outer wall 26; location in or on outer wall 26 may simplify communication of the sensed temperature data outside of cookware 20 as explained below.

Cookware 20 further comprises wireless transmitting device 32 that is operatively connected to the one or more temperature sensors 31 to receive sensed temperature data therefrom. This is one means of transferring data representative of a cookware temperature from the cookware to an external device such as induction cooking system 50, to allow the data to be further employed. In one implementation, device 32 may be an RF enabled microcontroller that communicates via RF with RF transceiver 66. Power can be provided to device 32 using coil 33 that is operatively connected to wireless transmitter 32. Coil 33 is inductively coupled to and derives power from the electromagnetic field that is output by induction coil 52. When such an energy pick-up coil 33 is used, it may be physically located closer to induction coil 52 than shown in the drawing, for example, embedded within or just below or on top of the lower portion 27 of cookware outer wall 26. Physical proximity accomplishes better coupling.

The temperature may alternatively or additionally be sensed remotely from the cookware, particularly in cases in which the outer surface of the cookware is hot. For example, temperature may be sensed in a structure that is in thermal contact with the cookware. One example is the cooktop. This could be accomplished with temperature sensor 60 located just below or embedded within or even on the top surface of cooktop 40 underneath the location at which cookware 20 will be located during use of the induction coil. The output of temperature sensor 60 is provided to system control 56. The disclosure is not limited to any particular means of sensing cookware temperature. As an additional example, temperature can be detected remotely from the cookware, e.g., via an infrared sensor located in the vicinity of the cooktop such as mounted to a fume hood. Further, the system can use an absolute cookware temperature as described above, or could use a relative cookware temperature that is offset from the actual temperature as long as the offset from actual temperature was known, at least approximately.

Figure 2A:
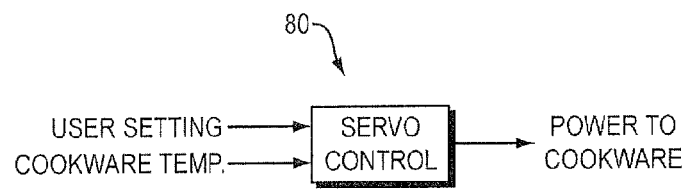
FIGS. 2A and 2B are functional block diagrams of a control arrangement employed in the cooking temperature and power control system of FIG. 1.
Figure 2B:
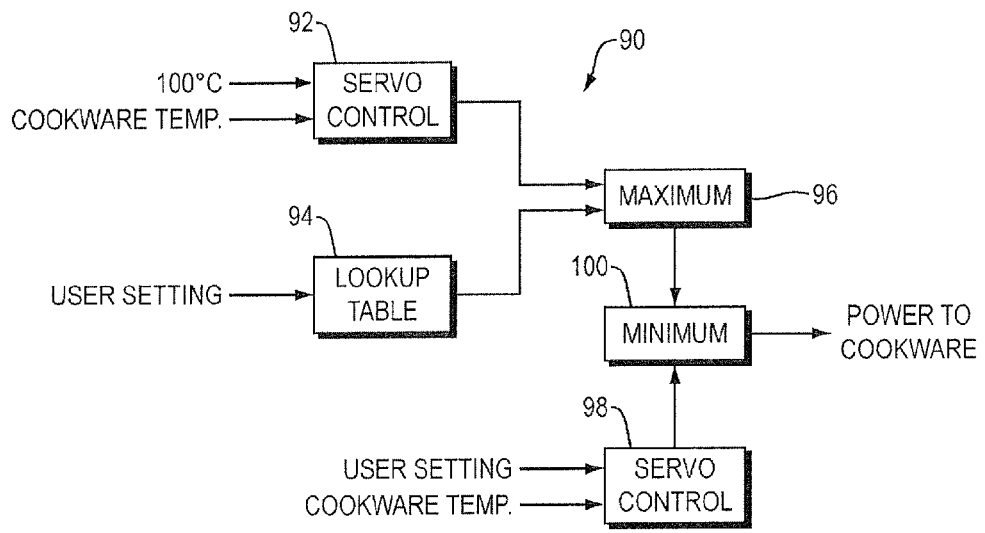

FIGS. 2A and 2B are functional block diagrams of one example of a control arrangement that can be employed in the cooking temperature and power control system of FIG. 1. Cooktops have a cookware heating control user interface, which is typically a one-dimensional manually manipulated device such as a knob that is turned, or a physical or virtual (e.g., capacitively-operated) slider or similar manually operated control. User-operated heating control user interface 58 is shown in FIG. 1. Heating control user interface 58 can have a temperature set point indicator or a power set point indicator or can be an arbitrary scale. In the non-limiting example herein heating control user interface 58 has an arbitrary scale of 0-100. The heating control user interface set point is interpreted (either by user control 58 itself or by system control 56) to derive one or more control outputs that are provided to coil drive system 54 so as to accomplish control of the amount of power delivered to cookware 20.

Heating control user interface 58 is used to control both the cookware temperature and the maximum limit of power that is delivered to the cookware—at least in certain circumstances and within a predetermined (first) portion of the user interface operating range. In an embodiment this portion of the operating range is around the boiling point, where cookware temperature is not a reliable indicator of the vigor of the boil and thus power control is needed in order to allow control of boiling vigor. In this embodiment, at user interface set point temperatures that are below and above this first portion of the operating range, the system controls the power delivered to the cookware so as to hold the cookware temperature constant at the desired cookware temperature set point.

The embodiment of the control arrangement shown in FIGS. 2A and 2B works as follows. The inputs are the heating control user interface setting and the measured cookware temperature. The heating control user interface setting is preferably interpreted (e.g., using a lookup table, not shown) as a desired cookware temperature set point; this temperature set point is then provided as one of the two variable inputs to the control arrangement. For heating control user interface temperature settings that are below or above a predefined (first) temperature range (e.g., above or below the range around boiling described above, which in one non-limiting example is from about 100° C. to about 150° C.), temperature servo control 80 is used by system control 56 to control the power delivered by coil drive system 54 to coil 52, and thus to control the power delivered to the cookware. The inputs to servo control 80 are the heating control user interface setting (specifically, the desired cookware temperature set point that is derived from the setting of heating control user interface 58), and the measured cookware temperature. The output of servo control 80 is a control signal that is used to control the power delivered to the cookware. Temperature servo control 80 thus governs the power setting so as to quickly bring the temperature up to the desired set point, and then hold the sensed cookware temperature constant at the desired set point.

There are many possible control laws that could be used to accomplish the temperature servo controls in the control arrangements shown in FIGS. 2A and 2B, as is known in the field. In an embodiment, servo control 80 is accomplished with a PID controller. A PI controller or other controllers known in the field that could accomplish the stated results could be used instead. Typically, the control law results in full power being provided to the cookware until the temperature is close to the desired set point, so that the food is quickly heated to the temperature set point. Temperature-based PID controllers for cookware are known in the art and so will not be further described herein. The gains used in the PID controllers depend on the particular hardware used in the cooktop and the cookware. For servo control 80 and the other two temperature-based control loops in the control arrangement shown in FIGS. 2A and 2B (servo controls 92 and 98), other types of controllers that are able to maintain a measured cookware temperature based on a temperature set point can be used. As one non-limiting example, PI controllers with zeros at 0.01 Hz can be used for the three temperature servo controls.

For heating control user interface settings that are within the predefined temperature range around boiling, control arrangement 90, FIG. 2B, is employed by system control 56. Arrangement 90 includes two temperature servo controls 92 and 98, both of which may be PI or PID temperature controllers, each of which is similar to servo control 80. The inputs to servo control 92 are the boiling temperature (nominally 100° C.) and the measured cookware temperature. Servo control 92 thus is able to keep the cookware temperature at 100° C. The inputs to servo control 98 are the heating control user interface setting (specifically, the desired cookware temperature set point that is derived from the setting of the heating control user interface) and the measured cookware temperature. Servo control 98 thus is able to keep the cookware temperature at the desired user set point. The third control aspect of arrangement 90 is power lookup table 94. The heating control user interface setting (specifically, the desired cookware temperature set point that is derived from the setting of the heating control user interface) is used to select the value for maximum available output power limit from LUT 94. Typically the output of LUT 94 is a power setting that monotonically rises with the user interface setting. An alternative to a LUT could be a function enabled by system control 56 that calculated a power based on the setting of heating control user interface 58. Also, the functions of both LUT 94 and the LUT (not shown) that is used to derive a desired temperature set point from the setting of the heating control user interface could be accomplished with a single lookup table, or in other manners that would be apparent to those skilled in the field such as via calculations based on the user setting.

The power that is actually provided to the cookware is then determined by selection of the minimum (block 100) of two values: the first value is the maximum (block 96) of the outputs of servo control 92 and LUT 94, and the second value is the output of servo control 98.

In an ideal sense the control scheme accomplished with servo control 80 could be accomplished by control arrangement 90, which would make servo control 80 superfluous. In this case, a beginning integral value for the PID controllers may need to be calculated when control passes from LUT 94 to a PID controller (or to any other PID-style controller that is like a PID controller in that it needs an input integral value), as there would be no previous integral value for use as an input to the PID loop. This calculation would be apparent to those skilled in the field. Once the initial condition of a PID-style controller (the last integral value) is provided, it creates its own input integral value from its output, so this calculation would only need to be done when control was first passed to the PID-style controller.

Figure 3:
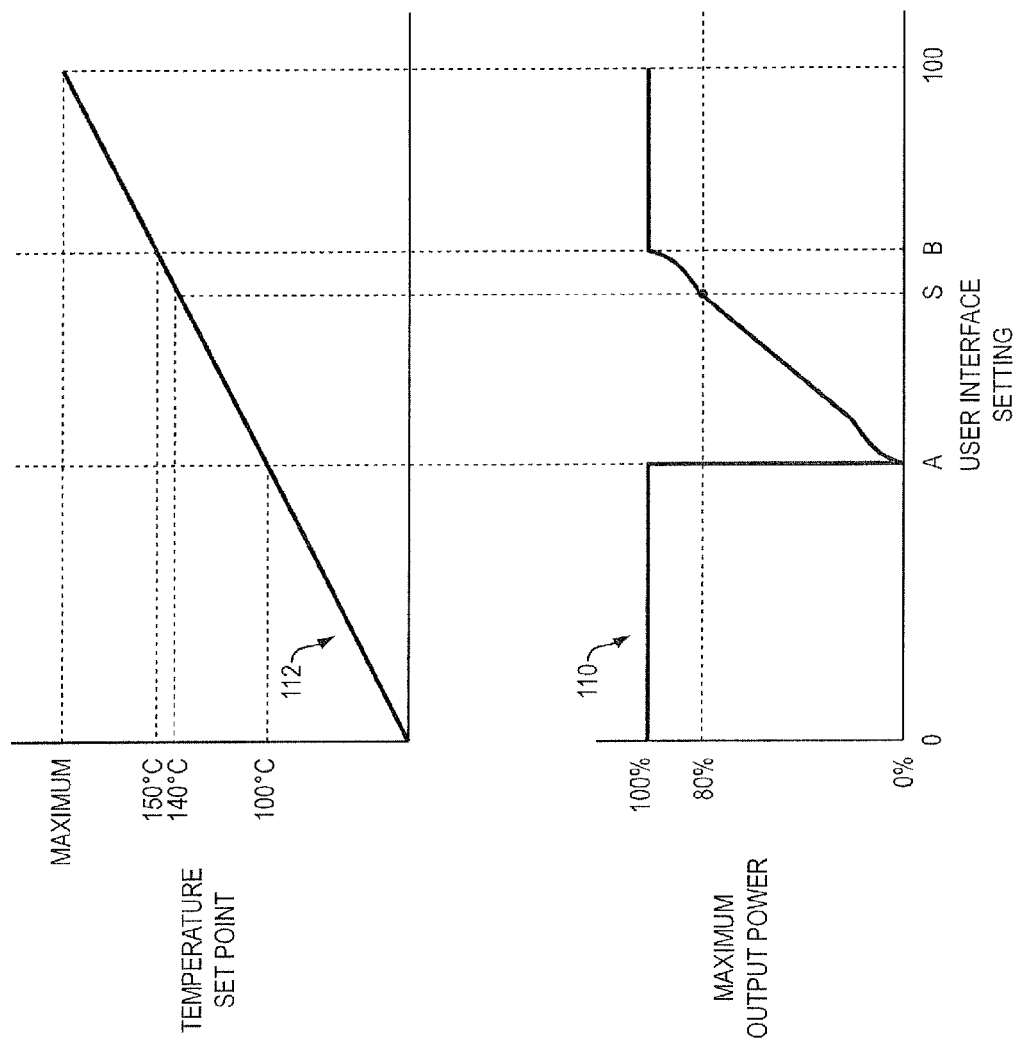
FIG. 3 depicts a translation of the cooking system user control or heating control user interface setting into two outputs—set point desired cookware temperature and maximum output power limit.

An example of the heating control user interface settings, the corresponding output power provided to the cookware, and the desired cookware temperature set point that is derived from the heating control user interface setting, is shown in FIG. 3. For heating control user interface settings between the lowest value (0) and the value labeled "A", and from the value labeled "B" up to the maximum value of 100, the output power limit (shown as graph line 110) is 100%. For settings between A and B the maximum output power limit increases monotonically over the A-B range from about 0% to 100% of the power that can be delivered to the cookware by the power control system. In one example, value A corresponds to the boiling point (nominally 100° C.) and value B corresponds to about 150° C. Graph line 112 shows the set point desired cookware temperatures (i.e., the "user setting" input to the control arrangement shown in FIGS. 2A and 2B) that correspond to the heating control user interface settings for the example illustrated in FIG. 3.

In the A to B temperature range the control law enabled by system control 56 controls the power provided to the cookware within a cookware temperature range bounded on the low end by point A and on the upper end by the temperature that corresponds to the heating control user interface setting (which is greater than A and less than B, labeled "S" in FIG. 3). The variable power level in the A-B range accomplishes better control over the vigor of boiling than does control based on a temperature-based control law as is used from 0 to A and from B to 100. The A to B temperature range includes the measured temperature at which boil begins and occurs, and extends for a desired temperature range above the boiling point to point B. The range selected would be specific to the hardware. For example, in cases in which the cookware temperature is measured (as opposed to, say, cases in which the food temperature is measured), the measured temperature may not correspond to the food temperature. In the example illustrated in FIG. 1, the measured temperature is the temperature of the target, which is typically hotter than the food. A target temperature of 110° C. may correspond to a food temperature of around boiling, which can be used as point A.

Boiling point variations dependent on elevation should also be taken into account. Typically, point A will be selected to be just below boiling (e.g., potentially in the range of from about 90° C. to about 110° C.); a higher value will cause sudden boiling and a lower value will cause slower heating times, especially for low power settings. Typically, point B is selected to achieve a cookware content temperature of around 150° C.; a higher value limits the cooking capabilities of the system because it slows heat-up time for any temperatures between A and B, while a lower value reduces the power resolution in the A-B range and thus results in poorer control of boil vigor. Point B is the maximum target temperature at which power is directly controlled by the user, and thus is the end point for direct control over boiling vigor. Depending on the construction of the cookware and where on the cookware the measured temperature value is taken, point B could potentially range down to closer to boiling (e.g., around 100° C. to around 120° C.) up to around 150° C. or perhaps higher. In a case in which the target temperature of induction cookware is the measured temperature value, point B will likely fall in the range of from about 120° C. to about 170° C.

The power control arrangement employed in this A to B range provides resolution which allows control over the vigor of boiling; this control can be accomplished over a desired range of boiling characteristics. For example, the range can be enabled from simmer (which actually begins a few degrees below the boiling point) through a vigorous rolling boil. The width or scale of the A to B temperature range should be large enough to allow for a desired power control granularity; a wider range is thus at least theoretically better. However, a functional tradeoff associated with the dual set point control arrangement over the selected A to B temperature range is the time period over which the food comes up to temperature when the desired temperature is in the A to B range and the food does not go through a phase change. As the control scheme provides less than full power over the A to B temperature range, heating of the food is slowed as compared to a standard temperature servo. This tradeoff thus suggests a relatively narrow A to B range. In practice the upper end of the range can be about 150° C. because not many foods are cooked in the range from above boiling up to about 150° C., so the practical risk associated with the longer heat-up time is minimal.

The slope of the power curve in the A-B range is selected to achieve a desired result. The slope can be greater around the end points because lower powers typically are not sufficient to maintain boil so fine control is not useful close to A, and small changes in high power close to B have little effect on the apparent vigor of the rolling boil around point B. Increasing slope around A and B allows a flatter curve across most of the midrange, providing the user with finer control over the power provided to the cookware and thus better control over the vigor of the boil. Other mappings of heating control user interface settings to power in the A-B range are contemplated herein. Typically, though, the function monotonically increases over the range so that the power increases as the control is turned up, as would be expected in cooktop operation.

The disclosure contemplates mapping the position of the heating control user interface to both a temperature set point and a provided output power value, over at least a portion of the system operating range. This mapping could be accomplished in other manners that would be apparent to those skilled in the field. For example, the values could be calculated by controller 56 using predetermined algorithms that were appropriate for the selected hardware.

The disclosure herein contemplates the use of one, or perhaps more than one, cookware temperature range over which power delivered to the cookware is controlled per se, rather than control to a temperature set point. Most commonly, but not necessarily, the boiling range will be included, as it is here where fine control over the energy is useful to provide better control over boiling vigor. The available output power function over relevant temperature range(s) need not be as depicted in FIG. 3. Rather, any function that achieves a desired power control over the selected temperature range(s) can be used, and enabled by system control 56.

Figure 4:
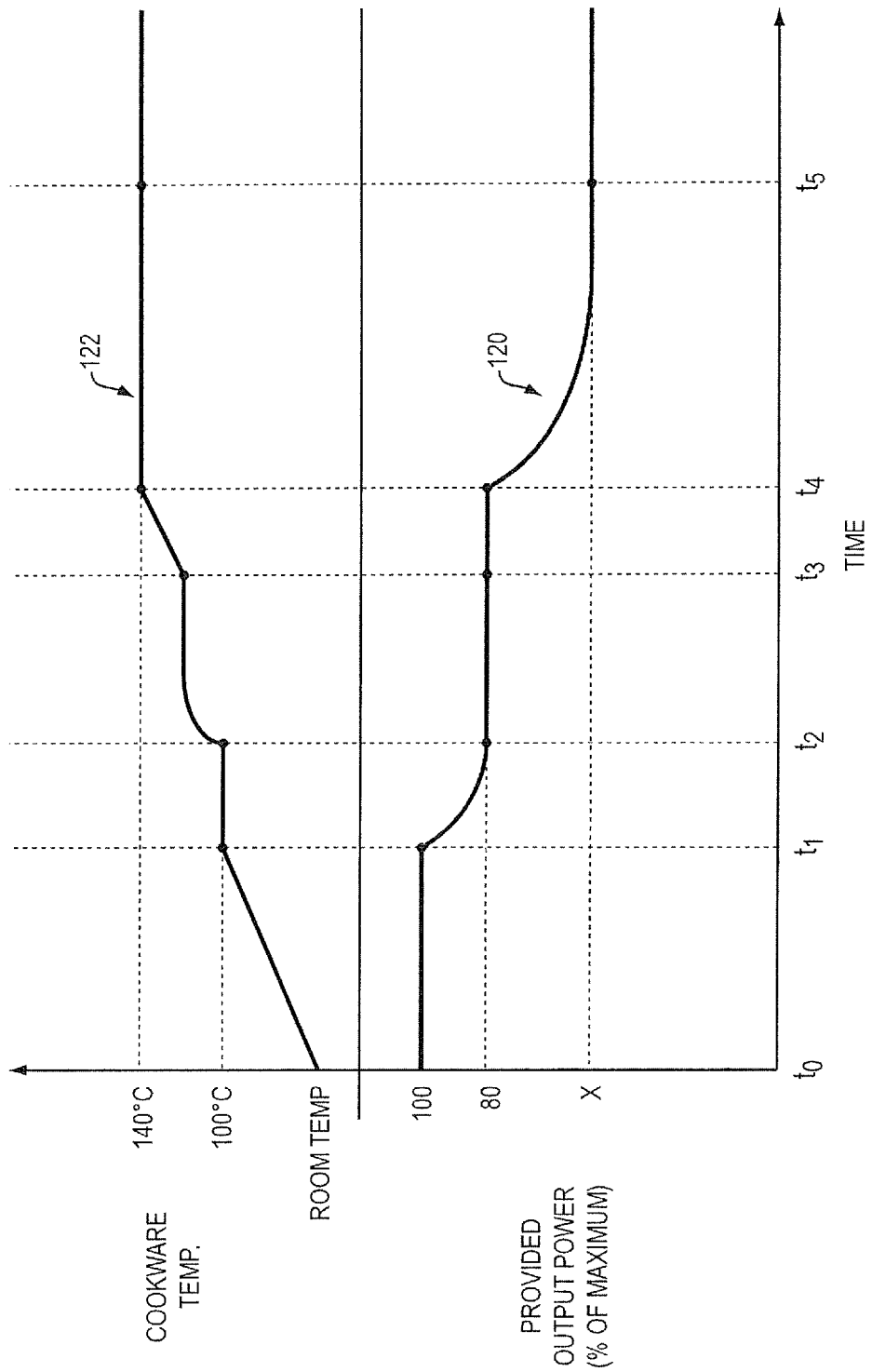
FIG. 4 illustrates the output power and cookware temperature over time for an example that illustrates the cooking temperature and power control.

FIG. 4 shows the provided output power (graph line 120) and cookware temperature (graph line 122) over time t0 (when the heating control user interface is set by the user) to t5 (when long term steady state temperature has been reached) for an example that illustrates an embodiment of the cooking temperature control. In the example, the heating control user interface is set to a value ("S", FIG. 3) which corresponds to 140° C. and a limit of 80% of maximum available output power. This setting (above 100° C. and below 150° C.) puts the control in the realm of arrangement 90, FIG. 2B. Boiling is indicated as 100° C., but could actually be higher than that: since the target is hotter than the food being cooked, when the target temperature is measured as opposed to the temperature of the contents of the cookware, the measured temperature at boiling will actually be above 100° C.

From time t0 to t1 (when the measured temperature reaches the temperature of boiling), the output (coil 52) power remains at 100% while the cookware temperature increases to boiling (nominally 100° C.)—this 100% output power is the servo control 92 output. During this time period the output of servo control 98 is also at 100%, so that as a practical matter either servo control 92 or servo control 98 could be in control. In a non-ideal sense as the cookware temperature approaches 100° C. servo control 92 will request less than 100% power while servo control 98 requests 100% power, giving control (because of minimum selection function 100) to servo control 92.

From t1 to t2 the power falls off to 80% while the cookware remains at boiling temperature. In this time period servo control 92 remains in control, as its output is greater than the 80% output of lookup table 94 (and thus is selected by maximum selection function 96), while the output of servo control 98 remains at 100% (and thus is deselected by minimum selection function 100). Power decays gradually because the temperature of the contents of the cookware lags that of the target, and as that temperature difference decreases the power required to maintain the target temperature at boiling (nominally 100° C.) decreases.

From t2 to t3 lookup table 94 is in control since its output (80%) is greater than the output of servo control 92 and less than the output of servo control 98. The output power thus remains at 80%, which causes the cookware to heat up until it reaches a new intermediate steady state value. One reason for the increase in temperature is that in the example for the cookware to remain at 100° C. requires less than 80% power. At 80% power, the target temperature will increase above 100° C., the boil vigor will increase and more steam will be created (the energy that does not maintain the boil goes into the creation of steam), and the target will eventually settle at a higher temperature. The rise in measured cookware temperature is similar to the reason the power dropped off between t1 and t2, except this time power is kept the same (at 80%), and temperature is allowed to rise.

From t3 to t4, because the temperature is less than the set point, servo control 98 remains at 100%. Thus, lookup table 94 is in control and the power remains at 80%. The cookware contents are dry enough that the temperature begins to increase above where it was during boiling, to the 140° C. user interface desired cookware temperature set point.

From t4 to t5 the temperature is at the desired cookware temperature set point, so servo control 98 causes the power to drop off to some level below 80% at which the cookware temperature is maintained at the 140° C. set point. The steady state output power value ("X") is indeterminate as it depends on the hardware construction, and the cookware contents. The gradual power decay from t4 to t5 is the effect of two aspects. One is that servo control 98 has taken over. The other is that, like when the system approached 100° C. and servo control 92 slowly reduced power because of the objects around the cookware, now servo control 98 is doing the same thing. The difference this time is that lookup table 94 is not in control because its 80% output power is greater than X, and so lookup table 94 does not stop the drop in power.

The disclosure herein relates to methods of cooking other than induction cooking. The disclosure involves control of the power provided to the cookware, regardless of the particular energy source or the manner in which the energy is delivered to the cookware. For example, electrical energy is used to heat cookware in both induction and resistance-based cooktops; the control scheme herein can be used with either type of electric cooktop. Also, gas is used to deliver the cooking energy in gas cooktops, and the gas flow rather than output power can be the controlled variable in the control scheme herein as a means to control the power delivered to the cookware. The disclosure herein controls the provision of power to the cookware so as to allow control of the cookware temperature and the vigor at which the contents boil.

A number of embodiments and options have been described herein. Modifications may be made without departing from the spirit and scope of the invention. Accordingly, other embodiments are within the claims.

What is claimed is:

1. A device configured to operate a cooking system used for heating a cooking utensil, where the cooking system comprises a temperature sensor that senses a temperature of the cooking utensil, and a user-manipulated heating control user interface that is used to establish a user control setting, the device comprising:
a controller that is input with: (i) the sensed temperature of the cooking utensil, (ii) the user control setting, and (iii) a particular temperature representing the boiling point, where the controller is configured to:
determine, based on all three of the inputs to the controller, a command to control the heating of the cooking utensil; and
output the command to the cooking system.

2. The device of claim 1 wherein the controller comprises:
a first temperature servo having as inputs: (i) the sensed temperature of the cooking utensil, and (ii) the user control setting, the first temperature servo providing an output power command that if applied to a heating element of the cooking system would cause the cooking utensil temperature to follow the user control setting;
a first processing block having the user control setting as an input, the processing block setting a maximum power output that can be applied to the cooking utensil associated with the user control setting; and
a second temperature servo having as inputs: (i) the sensed temperature of the cooking utensil and (ii) the particular temperature representing the boiling point; wherein the second temperature servo provides an output power command that if applied to a heating element of the cooking system would cause the temperature of the cooking utensil to follow the particular temperature representing the boiling point.

3. The device of claim 2 wherein the controller is further configured to:
determine a first maximum, the first maximum being determined as the maximum of (i) the output power command of the second temperature servo and (ii) the maximum power output of the first processing block; and
determine a first minimum, the first minimum being determined as the minimum of the (i) the first maximum, and (ii) the output of the first temperature servo;
wherein the output of the first minimum is provided as a command to control the heating of the cooking utensil.

4. The device of claim 1 where the controller is configured to determine, based on all three of the inputs to the controller, a command to control the heating of the cooking utensil and output the command to the cooking system, but only over a first portion of a temperature operating range that is defined by a lowest temperature and a highest temperature, and encompasses 100° C.

5. The device of claim 4 where there is a second portion of the temperature operating range that encompasses temperatures both above the highest temperature and below the lowest temperature of the first portion of the temperature operating range, and where in this second portion of the temperature operating range the controller is configured to determine, based on the sensed temperature of the cooking utensil and the user control setting, a command to control the heating of the cooking utensil and output the command to the cooking system.

6. The device of claim 4 wherein the command to control the heating of the cooking utensil establishes a maximum limit of power that can be delivered to the cookware, and over the first portion of the temperature operating range the maximum power limit is entirely non-decreasing as the temperature increases.

7. The device of claim 6 wherein over the second portion of the temperature operating range the maximum power limit is full power.

8. The device of claim 7 wherein over at least the second portion of the temperature operating range the controller uses a control law that results in full power being provided to the cookware until the temperature is close to a desired temperature set point that is established based on the user control setting.

9. The device of claim 1 wherein the cooking utensil comprises an inner wall that heats contents, a target that comprises an electrically conductive material and that is thermally coupled to the inner wall, and wherein the temperature sensor senses the temperature of one or both of the inner wall and the target.

10. The device of claim 1 wherein the heating control user interface is adapted to be turned up and turned down by the user to a particular heating control user interface set point, and wherein the user control setting comprises a desired cookware temperature set point that is derived from the setting of the heating control user interface.

11. The device of claim 1 wherein the particular temperature representing the boiling point is nominally 100° C.

12. The device of claim 1 wherein the cooking system comprises an induction heating system and the command to control the heating of the cooking utensil comprises a command to control the power delivered to the induction heating system.

13. The device of claim 1 wherein the cooking system comprises a resistive heating system and the command to control the heating of the cooking utensil comprises a command to control the power delivered to the resistive heating system.

14. The device of claim 1 wherein the cooking system comprises a gas heating system and the command to control the heating of the cooking utensil comprises a command to control the flow of gas in the gas heating system.

15. A device configured to operate a cooking system used for heating a cooking utensil, where the cooking system comprises a temperature sensor that senses a temperature of the cooking utensil, and a user-manipulated heating control user interface that is used to establish a user control setting, the device comprising:
a controller that is input with: (i) the sensed temperature of the cooking utensil, (ii) the user control setting, and (iii) a particular temperature representing the boiling point, where the controller is configured to:
determine, based on all three of the inputs to the controller and only over a first portion of the temperature operating range that is defined by a lowest temperature and a highest temperature, and encompasses 100° C., a command to control the heating of the cooking utensil, and output the command to the cooking system;
where there is a second portion of the temperature operating range that encompasses temperatures both above the highest temperature and below the lowest temperature of the first portion of the temperature operating range, and where in this second portion of the temperature operating range the controller is configured to determine, based on the sensed temperature of the cooking utensil and the user control setting, a command to control the heating of the cooking utensil and output the command to the cooking system; and
wherein the command to control the heating of the cooking utensil establishes a maximum limit of power that can be delivered to the cookware, and over the first portion of the temperature operating range the maximum power limit is entirely non-decreasing as the temperature increases.

16. A device configured to operate a cooking system used for heating a cooking utensil, where the cooking system comprises a temperature sensor that senses a temperature of the cooking utensil, and a user-manipulated heating control user interface that is used to establish a user control setting, the device comprising:
a user-manipulated user interface for interacting with the cooking system, the user interface adapted to be set by a user to settings over a user interface operating range;
a controller for controlling the power applied to the cooking utensil, where the controller is input with: (i) the sensed temperature of the cooking utensil, (ii) the setting of the user interface, and (iii) a particular temperature representing the boiling point;
wherein over a first portion of the operating range of settings of the user interface the controller applies power to the cooking utensil based on a difference between the sensed temperature of the cooking utensil and a temperature set point associated with the setting of the user interface, and;
wherein over a second portion of the operating range of settings of the user interface, the controller applies power to the cooking utensil up to a predetermined maximum power level, where the predetermined maximum power level is associated with the setting of the user interface.

17. The device of claim 16 wherein the cooking system comprises an induction heating system and the controller controls the heating of the cooking utensil by controlling the power delivered to the induction heating system.

18. The device of claim 16 wherein the cooking system comprises a resistive heating system and the controller controls the heating of the cooking utensil by controlling the power delivered to the resistive heating system.

19. The device of claim 16 wherein the cooking system comprises a gas heating system and the controller controls the heating of the cooking utensil by controlling the flow of gas in the gas heating system.

* * * * *